United States Patent
Suzuki et al.

(10) Patent No.: US 9,458,287 B2
(45) Date of Patent: *Oct. 4, 2016

(54) ALIPHATIC POLYESTER MANUFACTURING METHOD

(71) Applicant: KUREHA CORPORATION, Tokyo (JP)

(72) Inventors: Yoshinori Suzuki, Tokyo (JP); Fumio Maeda, Tokyo (JP); Takahiro Watanabe, Tokyo (JP); Hiroyuki Sato, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 165 days.

This patent is subject to a terminal disclaimer.

(21) Appl. No.: 14/183,848

(22) Filed: Feb. 19, 2014

(65) Prior Publication Data

US 2014/0171615 A1    Jun. 19, 2014

Related U.S. Application Data

(63) Continuation-in-part of application No. 13/202,646, filed as application No. PCT/JP2010/052362 on Feb. 17, 2010, now Pat. No. 8,691,912.

(30) Foreign Application Priority Data

Feb. 23, 2009  (JP) ................. 2009-039675

(51) Int. Cl.
  C08G 63/08   (2006.01)
  C08G 63/78   (2006.01)
  C08G 63/80   (2006.01)
  C08L 67/04   (2006.01)

(52) U.S. Cl.
  CPC ............ *C08G 63/08* (2013.01); *C08G 63/78* (2013.01); *C08G 63/80* (2013.01); *C08L 67/04* (2013.01)

(58) Field of Classification Search
  CPC .... C08G 63/08; C08G 63/78; C08G 63/785; C08G 63/80
  USPC ........... 528/354, 355; 525/53, 411, 413, 415
  See application file for complete search history.

(56) References Cited

U.S. PATENT DOCUMENTS

| 5,508,378 A | 4/1996 | Ohara et al. |
| 5,811,496 A * | 9/1998 | Iwasyk ............ B01J 3/042 525/437 |
| 5,889,127 A * | 3/1999 | Iiyama ............ C08G 63/78 524/366 |
| 8,691,912 B2 * | 4/2014 | Suzuki ............ B01J 19/006 525/411 |
| 2003/0125431 A1 | 7/2003 | Yamane et al. |
| 2010/0234557 A1 | 9/2010 | Sato et al. |
| 2011/0306733 A1 * | 12/2011 | Suzuki ............ B01J 19/006 525/415 |

FOREIGN PATENT DOCUMENTS

| JP | 2-99518 | 4/1990 |
| JP | 2005-97361 | 4/2005 |
| JP | 2008/163073 | 7/2008 |
| JP | 2009-30068 | 2/2009 |
| WO | 2007/086563 | 8/2007 |

OTHER PUBLICATIONS

International Search Report issued May 18, 2010 in International (PCT) Application No. PCT/JP2010/052362.
International Preliminary Report on Patentability issued Sep. 13, 2011 in International (PCT) Application No. PCT/JP2010/052362.

* cited by examiner

*Primary Examiner* — Roberto Rabago
(74) *Attorney, Agent, or Firm* — Birch, Stewart, Kolasch & Birch, LLP (57) ABSTRACT

A process for producing an aliphatic polyester, comprising: subjecting at least two serial stages of bulk-phase ring-opening polymerization and a solid-phase polymerization step, wherein a cyclic ester held in a dry air atmosphere is supplied to a first reactor to perform a first stage polymerization, thereby obtaining a partially polymerized molten product, and the resultant partially polymerized molten product is supplied to a second reactor held under a dry inert gas atmosphere to perform a second stage polymerization. As a result, the production efficiency can be improved, while maintaining excellent properties of the aliphatic polyester product.

8 Claims, 2 Drawing Sheets

ALIPHATIC POLYESTER MANUFACTURING METHOD

CROSS-REFERENCE TO RELATED APPLICATIONS

This is a continuation-in-part of U.S. patent application Ser. No. 13/202,646, filed on Aug. 22, 2011, U.S. Pat. No. 8,691,912, which is a national stage application of PCT/JP2010/052362, filed on Feb. 17, 2010, and claims priority to Japanese Patent No. 039675/2009, filed on Feb. 23, 2009.

TECHNICAL FIELD

The present invention relates to an improvement in process for producing an aliphatic polyester by ring-opening polymerization of a cyclic ester, such as glycolide.

BACKGROUND ART

Aliphatic polyesters, such as polyglycolic acid and polylactic acid, can be decomposed by microorganisms or enzymes present in nature, such as soil or sea water, so that they are noted as biodegradable polymer materials giving little load to the environment.

Among the aliphatic polyesters, polyglycolic acid is excellent in gas-barrier properties, such as oxygen gas-barrier property, carbon dioxide gas-barrier property and water vapor-barrier property, and also excellent in heat resistance and mechanical properties. Therefore, various applications or new uses of polyglycolic acid by itself or as a composite with another resin, are under development in the fields of packaging materials, etc.

An aliphatic polyester can be synthesized by dehydro-polycondensation of an α-hydroxycarboxylic acid, such as glycolic acid or lactic acid, while it is difficult to produce a high-molecular weight aliphatic polyester through this process. In contrast thereto, in order to effectively synthesize an aliphatic polyester of a high molecular weight, there has been adopted a process of synthesizing a bimolecular cyclic ester of an α-hydroxycarboxylic acid and subjecting the cyclic ester to ring-opening polymerization. For example, by ring-opening polymerization of glycolide that is a bimolecular cyclic ester of glycolic acid, polyglycolic acid is obtained. By ring-opening polymerization of lactide that is a bimolecular cyclic ester of lactic acid, polylactic acid is obtained. An aliphatic polyester can also be obtained by ring-opening polymerization of a lactone. Production process of aliphatic polyesters by the ring-opening polymerization of these cyclic esters are known from Patent documents 1-6, shown below, etc., for example. Moreover, also the present inventors, et al., have proposed a process for producing an aliphatic polyester, comprising: ring-opening polymerization of a cyclic ester to produce the aliphatic polyester, wherein a partial polymer in a molten state is continuously introduced into a biaxial stirring device to continuously obtain a partial polymer in a solid pulverized state, the partial polymer is subjected to solid-phase polymerization, and the resultant polymer is melt-kneaded together with a thermal stabilizer to be formed into pellets (Patent document 7).

In all the production processes of aliphatic polyesters by the ring-opening polymerization of these cyclic esters, it has been considered desirable to effect polymerization in an inert gas atmosphere, such as nitrogen gas, with one of few exceptions that Patent document 4 has proposed positive use of moisture in monomer including contribution of moisture in a reactor atmosphere as an initiator and an agent for regulating molecular weight of the product polyester. However, use of water having a molecular weight regulating function is not necessarily suitable for production of an aliphatic polyester having a high molecular weight and good moisture resistance.

PRIOR ART DOCUMENT

Patent Document

[Patent document 1] JP-A 7-126358
[Patent document 2] JP-A 10-60101
[Patent document 3] JP-A 2005-220203
[Patent document 4] WO2005/035623A
[Patent document 5] JP-A 11-349670
[Patent document 6] JP-A 10-168171
[Patent document 7] WO2007/086563A

SUMMARY OF THE INVENTION

Object of the Invention

An object of the present invention is to provide an improvement in polymerization in the above-mentioned Patent documents, particularly a process for producing an aliphatic polyester which has improved production efficiency, while maintaining the product properties.

Means for Achieving the Object

According to study of the present inventors, it has been found possible to achieve the above-mentioned object by effecting an appropriate atmosphere control in a former half of the polymerization. Based on the finding, a first embodiment of the process for producing an aliphatic polyester of the present invention, comprises: subjecting a cyclic ester to at least two serial stages of bulk-phase ring-opening polymerization and a solid phase polymerization step, wherein a cyclic ester held in a dry air atmosphere is supplied to a first reactor to perform a first stage polymerization, thereby obtaining a partially polymerized molten product, and the resultant partially polymerized molten product is supplied to a second reactor held under a dry inert gas atmosphere to perform a second stage polymerization. Further, a second embodiment of the process for producing an aliphatic polyester of the present invention, comprises: subjecting a cyclic ester to a bulk-phase ring-opening polymerization step, and a solid-phase polymerization step, wherein a cyclic ester held in a dry air atmosphere is polymerized in a first stage of bulk-phase ring-opening polymerization step, and a later stage of the bulk-phase ring-opening polymerization step is performed in a reactor held under a dry inert gas atmosphere.

According to the process for producing an aliphatic polyester of the present invention, regardless of the above-mentioned first embodiment or second embodiment, polymerization advances effectively in an early stage of the polymerization due to an appropriate concentration of oxygen contained in the cyclic ester by contact with dry air, and by advancing the polymerization process subsequently in a dry inert gas atmosphere, it becomes possible to prevent deterioration of the characteristics as represented by moisture resistance of product aliphatic polyester due to existence of superfluous oxygen and water existing in the atmosphere, and also stabilization of a polymerization process is attained.

EMBODIMENTS FOR PRACTICING THE INVENTION (Cyclic Ester)

Preferred cyclic esters used in the present invention may include cyclic diesters of α-hydroxycarboxylic acids and lactones. Examples of the α-hydroxycarboxylic acids providing the cyclic diesters may include: glycolic acid, L- and/or D-lactic acid, α-hydroxybutanoic acid, α-hydroxyisobutanoic acid, α-hydroxyvaleric acid, α-hydroxycaproic acid, α-hydroxy-isocaproic acid, α-hydroxyheptanoic acid, α-hydroxy-octanoic acid, α-hydroxydecanoic acid, α-hydroxymyristic acid, α-hydroxystearic acid, and alkyl-substituted products of these.

Examples of the lactones include β-propiolactone, β-butyrolactone, pivalolactone, γ-butyrolactone, δ-valerolactone, β-methyl-δ-valerolactone and ε-caprolactone. The cyclic etheresters may include dioxanone, for example.

A cyclic ester having an asymmetric carbon atom may be any of a D-isomer, an L-isomer and a racemic mixture of these.

These cyclic esters may be used either singly or in any combination thereof. When two or more cyclic esters are used in combination, an arbitrary aliphatic copolyester can be obtained. The cyclic ester may be copolymerized with another comonomer. Examples of such another comonomer include cyclic monomers, such as trimethylene carbonate and 1,3-dioxolane.

Among the cyclic esters, glycolide, which is a cyclic diester of glycolic acid, L- and/or D-lactide, which is a cyclic diester of L- and/or D-lactic acid, and mixtures thereof are preferred, with glycolide being further preferred. Glycolide may be used alone. However, it may also be used in combination with another cyclic monomer to produce a polyglycolic acid copolymer (copolyester). When the polyglycolic acid copolymer is produced, it is desirable that a proportion of glycolide copolymerized is preferably at least 70% by weight, more preferably at least 80% by weight, particularly preferably at least 90% by weight from the viewpoint of physical properties of the copolyester formed, such as crystalline properties, and gas-barrier properties. As preferable examples of the cyclic monomer copolymerized with glycolide, lactide, ε-caprolactone and trimethylene carbonate are raised.

No particular limitation is imposed on the production process of the cyclic ester. For example, glycolide can be obtained by a process comprising depolymerizing a glycolic acid oligomer. As the depolymerization process of the glycolic acid oligomer, there may be adopted, for example, a melt depolymerization process described in U.S. Pat. No. 2,668,162, a solid-phase depolymerization process described in JP-A 2000-119269, or a solution-phase depolymerization process described in JP-A 328481/1997 and WO 02/14303A1. Glycolide obtained as a cyclic condensate of a chloroacetic acid salt, which is reported in K. Chujo, et al., Die Makromolekulare Chemie, 100(1967), 262-266, can also be used.

Among the depolymerization processes described above, the solution-phase depolymerization process is preferred for obtaining glycolide. According to the solution-phase depolymerization process, (1) a mixture containing a glycolic acid oligomer and at least one high-boiling polar organic solvent having a boiling point within a range of 230-450° C. is heated to a temperature, at which the depolymerization of the oligomer takes place, under ordinary pressure or under reduced pressure; (2) the oligomer is melted in the solvent until a residual rate (volume ratio) of a melt phase of the oligomer reaches 0.5 or lower, (3) the heating is further continued at the same temperature to depolymerize the oligomer, (4) a cyclic diester (i.e., glycolide) formed is distilled out together with the high-boiling polar organic solvent, and (5) glycolide is recovered from the distillate.

Examples of the high-boiling polar organic solvent may include aromatic carboxylic acid esters, such as bis (alkoxyalkyl) phthalates such as di (2-methoxyethyl) phthalate, alkylene glycol dibenzoates such as diethylene glycol dibenzoate, benzylbutyl phthalate, and dibutyl phthalate; aromatic phosphoric acid esters such as tricresyl phosphate; and polyalkylene glycol ethers such as polyethylene dialkyl ethers. The high-boiling polar organic solvent is generally used in an amount of 0.3 to 50 times the weight of the oligomer. Polypropylene glycol, polyethylene glycol, tetraethylene glycol or the like may be used as a solubilizing agent for the oligomer in combination with the high-boiling polar organic solvent, as needed. The depolymerization temperature of the glycolic acid oligomer is generally 230° C. or higher, preferably 230 to 320° C. Although the depolymerization is performed under atmospheric pressure or a reduced pressure, it is preferable to heat the oligomer under a reduced pressure of 0.1 to 90.0 kPa (1 to 900 mbar) to depolymerize it.

<<Production of Aliphatic Polyester>>

Figure 1:
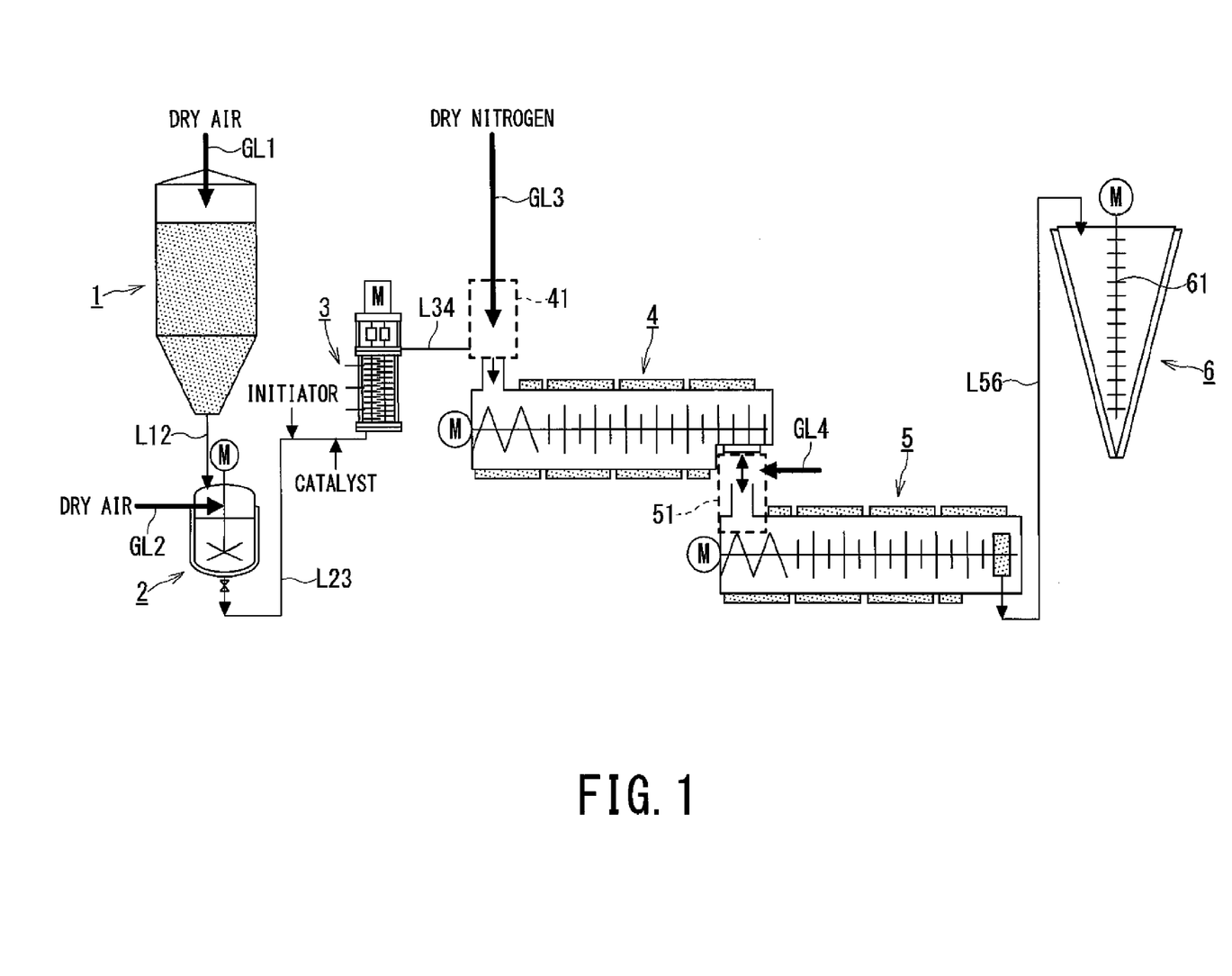
FIG. 1 shows an illustrative flow chart of an example of a suitable apparatus system for practicing an embodiment of the process of the present invention.

In a first embodiment of the process of the present invention, an aliphatic polyester can be produced by using the above-mentioned cyclic ester as a starting material according to an apparatus system as illustrated in FIG. 1 as a suitable example. With reference to FIG. 1 showing a schematic structure, the apparatus system includes a monomer tank 1, a monomer melting vessel 2, a first reactor 3, a second reactor 4, and a solidifying and crushing apparatus 5, which are disposed substantially in series, and thereafter a plurality (of which only one being shown) of solid-phase polymerization apparatus 6 which can be operated alternately. Among these, the monomer melting vessel 2 and the apparatus 3-6 are each provided with a temperature control segment. The temperature control segments may be any type including: a jacket type using a heat transfer medium of a heat transfer oil, steam, warm water, cold water, etc.; a non-jacket type, such as electric heater, infrared heater, air-cooling fan, etc.; or a combination of these types. In FIG. 1, "M" represents a motor for driving an associated stirring device, screw crusher or agitator.

First Embodiment

Hereafter, preferred embodiments of the process for producing an aliphatic polyester according to the first embodiment of the present invention are described principally with reference to the case of producing polyglycolic acid by ring-opening polymerization of glycolide which is a preferred embodiment of the present invention.

(Dry Air, Monomer Tank 1, Monomer Melting Vessel 2)

According to the present invention, a gaseous space in the monomer tank 1 and the monomer melting vessel 2 are held in a dry air atmosphere with dry air supplied thereto through pipes GL1 and GL2. Herein, "dry air" representatively refers to a dried material of an atmospheric air comprising about 21% of oxygen, and a little more than 78% of nitrogen as principal components, but the oxygen content therein can be increased or decreased within a range of about 10 to 21% by adding oxygen or nitrogen thereto, depending on the polymerizability of a cyclic ester concerned. For example, for glycolide having a relatively high polymerizability, dried atmospheric air may be used as it is or after dilution as needed to suppress the polymerization promotion effect of oxygen. On the other hand, for a cyclic ester monomer having a lower polymerizability, such as lactide, the oxygen concentration may be raised to increase the polymerization promotion effect. Generally, moisture in the air has effects of reducing the molecular weight and reducing moisture resistance of the product aliphatic polyester, and the effects thereof fluctuate by change of the moisture content in the air, so that the air used at this stage should be dried so to have a dew point of at most −10° C., preferably −30° C. or below.

In the monomer tank 1, the cyclic ester monomer is held in a powdery form having a diameter of 3 mm or less so as to promote the melting (fusion) of the cyclic ester monomer in the subsequent monomer melting vessel 2, and is supplied through the pipe L12 to the monomer melting vessel 2 timely depending on the residual amount of the melted monomer in the monomer melting vessel 2.

In the monomer melting vessel 2, the powdery cyclic ester monomer supplied from the monomer tank 1 is heated to a melting temperature thereof or above, generally to a temperature of about 85-150° C., to be melted and to be supplied thereafter to a first reactor. The thus-formed melted monomer in the monomer melting vessel 2, generally contains dissolved oxygen at a controlled concentration of 1.0-3.0 vol % (a volume of dissolved oxygen in a normal state (at 0° C. and 1 atm.)/a monomer liquid volume×100), preferably 1.0-2.5 vol %, and a moisture content therein is suppressed to below 60 ppm (by wt.), preferably below 30 ppm (by wt.).

(Initiator, Catalyst)

An initiator (and molecular weight-control agent) and a catalyst are supplied to the first reactor 3, together with the above-mentioned cyclic ester monomer.

As an initiator (and molecular weight-control agent), it is possible to use water; a monohydric alcohol, such as butanol or dodecanol (lauryl alcohol), preferably a higher alcohol; or a polyhydric alcohol, such as butanediol, hexanediol or glycerin.

No particular limitation is imposed on the catalyst so far as it may be used as a ring-opening polymerization catalyst for respective cyclic esters. Specific examples of such catalysts include metallic compounds such as oxides, chlorides, carboxylates and alkoxides of tin (Sn), titanium (Ti), aluminum (Al), antimony (Sb), zirconium (Zr) and zinc (Zn). More specifically, preferable examples thereof include tin compounds such as tin halides (for example, tin dichloride, tin tetrachloride, etc.) and organic tin carboxylates (for example, tin octanoates such as tin 2-ethylhexanoate); titanium compounds such as alkoxytitanium; aluminum compounds such as alkoxyaluminum; zirconium compounds such as zirconium acetylacetone; and antimony halides. However, these are not exhaustive.

The amount of the catalyst used may be in a small amount relative to the cyclic ester and is generally at most 300 ppm, preferably 1-100 ppm, more preferably 10-60 ppm, based on the cyclic ester.

The cyclic ester monomer in the monomer tank 1 can also be directly supplied to the first reactor 3 using a dry-feeding equipment, without via the monomer melting vessel 2. Moreover, the initiator and the catalyst can also be directly supplied to the first reactor 3. However, in order to uniformly disperse these additives in the monomer before the polymerization, it is preferred that the monomer is melted beforehand in the monomer melting vessel 2 and the additives are dispersed in the monomer before being supplied to the first reactor 3. More specifically, it is preferred to supply the initiator to an intermediate point in the charging line L23 between the monomer melting vessel 2 and the first reactor 3. The catalyst may preferably be fed in a state of paste, melt or solution, further preferably in a solution state, so as to be uniformly dispersed in the monomer prior to polymerization. In order to prevent the remaining of a solvent in the resultant polymer, it is particularly preferred to dilute the catalyst at a concentration of at most 0.1 g/ml, more preferably at most 0.05 g/ml, further preferably 0.001-0.02 g/ml, by using a low-boiling solvent which is volatile at a polymerization temperature, inclusive of ethers such as diethyl ether, ketones such as acetone, and carboxylic acid esters such as ethyl acetate, and feed the solution to an intermediate point in the feed line L23 for feeding the monomer supplied in a molten state. The above-mentioned concentration is not restrictive as far as it allows a quantitative feed. Further, it is also possible to dissolve the catalyst in at least a portion of the initiator to feed a mixture solution of the catalyst and the initiator. Also in this case, the concentration may be appropriately selected within an extent of allowing a quantitative feed depending on the combination of the catalyst and the initiator. The catalyst solution should preferably be held in an atmosphere of inert gas, such as nitrogen. Generally, the initiator may be added to the monomer prior to the catalyst or may be added simultaneously with the catalyst on the monomer feed line. In order to further improve the dispersibility of these additives, it is also possible to equip the feed line with a mixing device such as a static mixer after the feed point.

(First Reactor 3)

In the first reactor 3, the polymerization temperature is controlled at 100-240° C., preferably 120-220° C., with a heat transfer medium fed to and discharged from a jacket which may be divided into two or more sections, as desired, so as to attain a conversion of preferably 5-50%, more preferably 10-40%, further preferably 15-40%, within a residence time of 1-30 min., preferably 3-15 min., set so as to provide the conversion. In the present invention, the above-mentioned conversion capable of reducing the polymerization load of the second-stage and thereafter is attained owing to the dissolved oxygen at a concentration of 1.0-3.0 vol % in the monomer held in a dry air atmosphere, particularly preferably melted in the monomer melting vessel 2 in a dry air atmosphere. However, an excessively high conversion is accompanied with increased discoloration of the partial polymer (or partially polymerized product) and an increased load of stirring in the first reactor, so that there is a restriction.

As the stirring device, it is preferred to use a multi-stage paddle blade, a helical ribbon blade, a helical screw blade or a vertical or horizontal biaxial stirring device as disclosed in JP-A 11-279267, suitable for stirring of high-viscosity contents at a high conversion. Further, it is also possible to use a heat exchanger-type reactor or a jacket-heated (multi-) tubular reactor free from stirring devices.

It is further preferred to use a fully filled-type stirring vessel 3 (equipped with a biaxial multi-stage (or multi-level) stirring device in this embodiment) as shown in FIG. 1 for the purpose of preventing attachment onto the exposed wall, etc., of the vessel due to fluctuation of liquid level in the stirring vessel and so as to unnecessitate the control of the gaseous space atmosphere (required to retain a dry air environment of a lower oxygen concentration, if present).

(Second Reactor 4)

Into a second reactor 4, the partial polymer (or partially polymerized product) from the first reactor 3 is introduced in a molten state through a connection part 41 and a pipe L34 which are held in a dry nitrogen atmosphere. The connection part 41 is a box-like space for receiving the viscous partial polymer flowing thereinto and drawing down the viscous partial polymer to the inside of the second reactor 4, and the inside thereof is held in an atmosphere of dry nitrogen introduced through a pipe GL3. The temperature inside the second reactor 4 is controlled at a temperature of 120-240° C., preferably 140-220° C., with a heat transfer medium fed to and discharged out of a jacket (which may be divided into two or more sections, as desired) so as to increase the conversion up to preferably 50-90%, more preferably 60-87%. In order to process such high-viscosity contents while providing a necessary residence time of, e.g., 5-20 min., a vertical or horizontal biaxial stirring device is preferably used as the stirring device in the second reactor 4, and a horizontal biaxial stirring device as shown in FIG. 1 is particularly preferred because of conveyability and self-cleaning characteristic. The residence time can also be adjusted by an inclination of installation angle of the stirring device or a diameter of discharge port of the stirring device. The conversion at this stage may also be desirably as high as possible, but the increase in polymerization conversion may be restricted by the increased liability of discoloration of the resultant partial polymer.

(Solidifying-and-Crushing Apparatus 5)

In a solidifying-and-crushing apparatus 5 which is a biaxial stirring apparatus used in a preferred embodiment of the present invention, the partial polymer from the second reactor 4 is introduced in a molten state through a connection part 51 held in a dry nitrogen atmosphere. In at least a latter part of the solidifying-and-crushing apparatus 5, the partial polymer is solidified and continuously discharged in a crushed state by using the solid crushing power of the biaxial stirring apparatus. For this purpose, the temperature of the partial polymer has to be lowered below the melting point of the resultant aliphatic polyester at the outlet of the apparatus 5, and the temperature of a heat transfer medium fed to and discharged out of a jacket (which may be divided into two or more sections, as desired) may ordinarily be adjusted to be lower than the melting point. Depending on the conversion of the partial polymer, the melting point and crystallization temperature from its melting state thereof are changed. Generally, a higher conversion leads to higher melting point and crystallization temperature. As the temperature of the heat transfer medium approaches the melting point of the partial polymer, the partial polymer discharged out of the solidifying-and-crushing apparatus 5 is liable to be discharged in larger particles due to melt-sticking thereof. As the temperature of the heat transfer medium is excessively lower than the crystallization temperature of the partial polymer, the partial polymer discharged out of the solidifying-and-crushing apparatus 5 is liable to be an amorphous sticky state because of incomplete crystallization due to quenching. Accordingly, the temperature of the heat transfer medium in the solidifying-and-crushing apparatus 5 may be determined appropriately depending on the conversion of the partial polymer supplied thereto. More specifically, the principal functions of the solidifying-and-crushing apparatus 5 are solidification and crushing of the partial polymer supplied thereto, and further polymerization of the partial polymer is a secondary function depending on the heat capacity of the partial polymer introduced from the second reactor, a heat capacity accompanying a phase change of solidification from the molten liquid and a residence time (e.g., 1-10 min.) allowed in the solidifying-and-crushing apparatus 5. Accordingly, while it may depend on the conversion at the outlet of the second reactor, the conversion in the solidifying-and-crushing apparatus 5 is ordinarily at most 5%, particularly about 0-3%, and in order to suppress the discoloration of the solid partial polymer discharged, a final conversion is preferably 50-95%, particularly 60-90%. The solidifying-and-crushing apparatus 5 may comprise a reverse-directional or equi-directional biaxial stirring device, but an equi-directional biaxial stirring device exhibiting a better conveyability of the partial polymer is preferred, and a horizontal biaxial stirring device is preferred for a similar reason. As the crushed product, particles ranging from fine powder up to particle size exceeding 30 mm may be obtained, but in view of the processability, the average particle size thereof may preferably be on the order of 1-20 mm. As uniform a particle size as possible is preferred in order to attain a uniformity of polymerization degree in a subsequent solid-phase polymerization step.

(Solid-Phase Polymerization)

The solid crushed product of partial polymer obtained, preferably by using a solidifying-and-crushing apparatus 5, in the above-described manner, is held at a temperature of at most the melting point thereof, preferably in a range of the melting point—100° C. to −20° C. for a prescribed time to accomplish a conversion of at least 98%, preferably 99-100%, and reduce the residual monomer content to at most 2%, preferably at most 1%. As the device or apparatus therefor, it is possible to use any batchwise or continuous transfer-type device capable of retaining the partial polymer at a prescribed temperature for a prescribed time of, e.g., 0.5-10 hours, preferably 1-5 hours, required for accomplishing the above conversion in an atmosphere of inert gas, such as nitrogen, for example, a reverse cone-type conduction heat transfer device, a drum-type device, a groove-type conduction heat transfer device, a fluidized bed drier, a pneumatic drier or a conveyer. In the case of using a continuous transfer-type device, it is also possible to form a reduced pressure atmosphere at a latter stage thereof, thereby further reducing the residual cyclic ester content in the product polymer. The embodiment shown in FIG. 1 uses a reverse cone-type conduction heat transfer device 6 equipped with a powder stirring device 61. The device is basically operated batchwise. Accordingly, it is preferred to dispose a plurality of such devices so as to use them alternately for receiving and storing the solid crushed product of the partial polymer from the polymerization-and-crushing system and for solid-phase polymerization.

Second Embodiment

Figure 2:
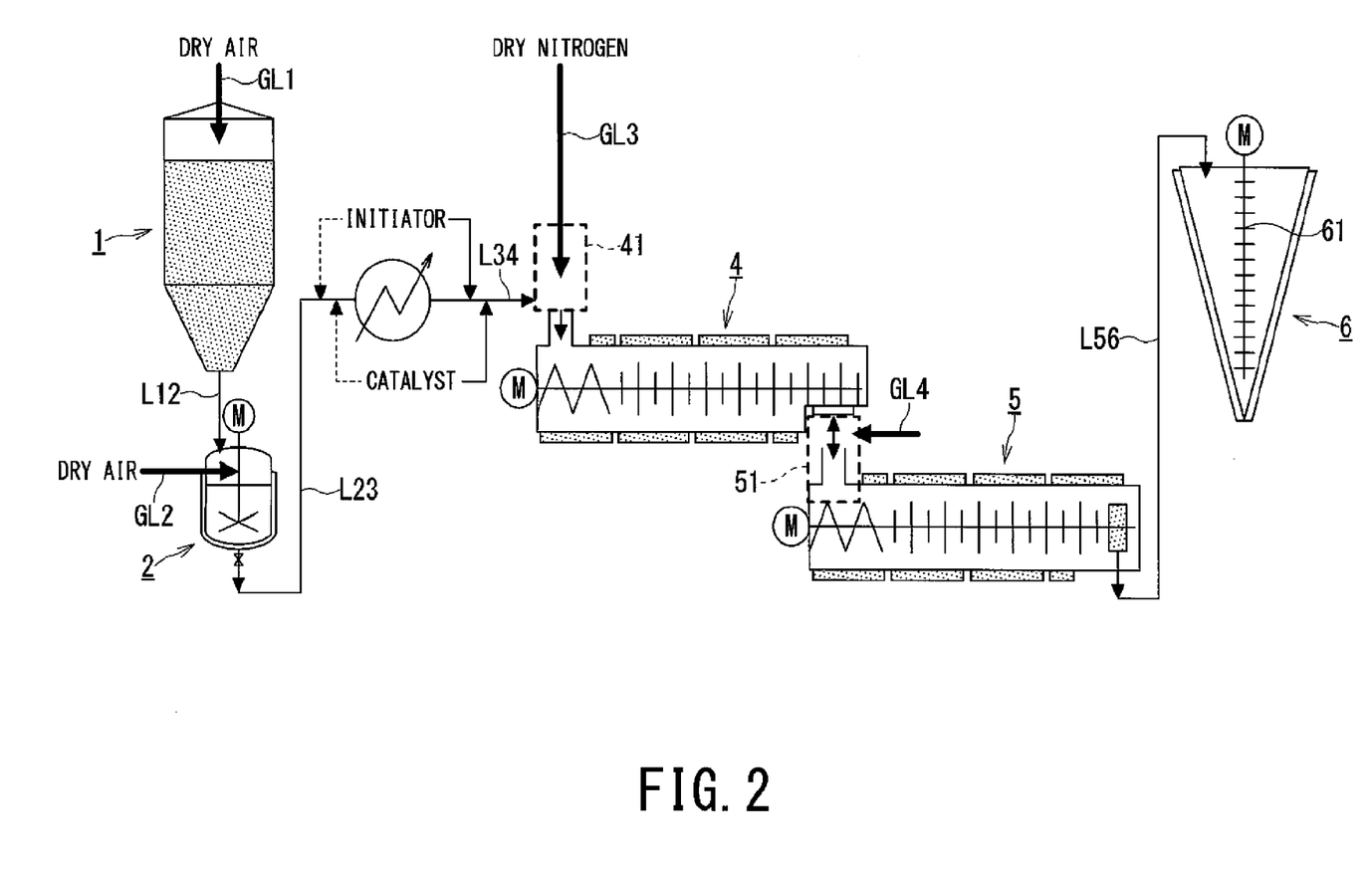
FIG. 2 shows an illustrative flow chart of another example of a suitable apparatus system for practicing an embodiment of the process of the present invention.

FIG. 2 is an illustrative flow chart of another example of apparatus system for practicing the second embodiment or a variation of the above-mentioned first embodiment of the process of the present invention.

The apparatus system of FIG. 2 differs from that of FIG. 1 in that an optionally provided heat exchanger HE is shown instead of the first reactor 3 in the system of FIG. 1, and does not differ from the system of FIG. 1 in other respects. In case whether the heat exchanger is a heater, i.e., a heat exchanger-type reactor or a jacket-heated (multi-)tubular reactor, the apparatus system of FIG. 2 may be classified as a variation of the system of FIG. 1 according to the first embodiment, and in case where the heat exchanger HE is used as a moderate pre-heater or omitted, the system of FIG. 2 functions as an apparatus for the second embodiment. Even in the latter case, however, if the reactor 4 is provided in a plurality in series, the system of FIG. 2 may still be classified as an apparatus system for practicing the first embodiment. Consequently, regardless of the first or second embodiment, if the conversion up to 50 to 90%, more preferably 60 to 87%, is realized before entering the solidifying-and-crushing apparatus 5, the objective effect of the present invention, i.e., the initial stage of polymerization is promoted by the inclusion of oxygen in the reactant and the latter stage of the bulk-phase ring-opening polymerization is stably performed in an inert gas atmosphere, can be achieved. It will be easily understood that a desired conversion can be achieved at the outlet of each reactor by appropriately controlling the reaction temperature and the residence time in each reactor. An initiator and a catalyst may be injected into the pipe L23 before or the pipe L34 after the heat exchanger HE depending on whether or not the heat exchanger HE is positively used as a reactor.

(Modification)

While preferred embodiments of the process for producing an aliphatic polyester of the present invention have been described by referring to FIGS. 1 and 2 in the above, various modifications are possible within the scope of the present invention. For example, it is possible to proceed with a first stage reaction with a stirring-type batch process reactor, and then proceed with a second stage polymerization of the partially polymerized product in a batchwise static tube reactor.

(Pelletization)

The polymer, i.e., aliphatic polyester, obtained in a crushed state in the above-described manner, may preferably be melt-kneaded together with a thermal stabilizer to be pelletized prior to being subjected to the solid-phase polymerization step.

Preferred examples of the thermal stabilizer may include: phosphoric acid esters having a pentaerythritol skeleton, such as cyclic neopentane-tetra-il-bis (2,6-di-tert-butyl-4-methylphenyl) phosphite, cyclic neopentane-tetrayl-bis (2,4-di-tert-butylphenyl) phosphite, and cyclic neopentane-tetrayl-bis (octadecyl) phosphite, alkyl phosphates or alkyl phosphites having an alkyl group of preferably 8-24 carbon atoms mono- or di-stearyl acid phosphate or a mixture of these; metal carbonates, such as calcium carbonate and strontium carbonate, further, those generally known as polymerization catalyst deactivators, inclusive of hydrazine compounds having a —CONHNH—CO-unit, such as bis [2-(2-hydroxybenzoyl) hydrazine] dodecanoic acid and N,N'-bis[3-(3,5-di-t-butyl-4-hydroxyphenyl) propionyl] hydrazine; triazole compounds, such as 3-(N-salicyloyl) amino-1,2,4-triazole; and further triazine compounds. The structures of these thermal stabilizers are disclosed in WO2003/037956A1, if necessary. These thermal stabilizers may preferably be used in a proportion of at most 3 wt. parts, more preferably 0.003-1 wt. part, most preferably 0.01-0.05 wt. part, per 100 wt. parts of aliphatic polyester.

Further, by adding a carboxyl group-capping agent in addition to the thermal stabilizer, it is possible to improve the moisture resistance (resistance to hydrolysis) of the product aliphatic polyester.

As the carboxyl group-capping agent, it is possible to use compounds generally known as moisture resistance-improving agents for aliphatic polyesters such as polylactic acid. Examples thereof may include: carbodiimide compounds inclusive of monocarbodiimides and polycarbodiimides, such as N,N-2,6-diisopropulphenylcarbodiimides; oxazoline compounds, such as 2,2'-m-phenylene-bis (2-oxazoline), 2,2'-p-phenylenebis (2-oxazoline), 2,2-phenyl-2 oxazoline and styrene-isopropenyl-2-oxazoline; oxazine compounds, such as 2-methoxy-5,6-dihydro-4H-1,3-oxazine; and epoxy compounds, such as N-glycidyl-diphthalimide, cyclohexene oxide and triglycidyl isocyanurate. Among these, carbodiimide compounds and epoxy compounds are preferred. These carboxyl group-capping agents can be used in combination of two or more species, as desired, and may preferably be used in a proportion of 0.01-10 wt. parts, more preferably 0.1-2 wt. parts, particularly 0.2-1 wt. part, per 100 wt. parts of the aliphatic polyester.

The above-mentioned crushed product of aliphatic polyester and the thermal stabilizer, and the optionally added carboxyl group-capping agent may be melted (and mixed) by heating in a temperature range of the melting point of aliphatic polyester+5° C. to the melting point+60° C.; and preferably in a temperature range of 230-280° C., more preferably 240-270° C., e.g., in the case where the aliphatic polyester is polyglycolic acid (PGA). The melting (and mixing) means may basically be arbitrary, inclusive of a stirrer, a continuous kneader, etc., but the melting (and mixing) may preferably be performed in an extruder (e.g., an equi-directionally rotating twin-screw extruder) allowing a short-time processing and a smooth transition to a subsequent cooling step. In the case of PGA for example, the addition effects of a thermal stabilizer and a carboxyl group-capping agent are liable to be insufficient at a melting temperature below 230° C. In excess of 280° C., on the other hand, the PGA resin composition is liable to be discolored. In the case of using an extruder and adding a carboxyl group-capping agent in addition to the thermal stabilizer, the addition effects of the additives can be maximized by feeding the thermal stabilizer together with the aliphatic polyester from a hopper at the extruder inlet and feeding the carboxyl group-capping agent from an intermediate stage of the extruder. Further, it is also possible to impart a reduced pressure, as desired, to the melt at a middle or later stage of the extruder, thereby further reducing the residual cyclic ester.

It is possible to use a filler in order to impart a mechanical strength and other properties to the aliphatic polyester. The filler is not particularly limited in species but may be in the form of fiber, plates, powder or particles. Specific examples thereof may include: fiber or whisker form fillers, such as glass fiber, PAN-based and pitch-based carbon fiber metal fiber, such as stainless steel fiber, aluminum fiber and brass fiber, natural fiber of chitin, chitosan, cellulose, cotton, etc., organic synthetic fiber such as aromatic polyamide fiber, gypsum fiber, ceramic fiber, asbestos fiber, zirconia fiber, alumina fiber, silica fiber, titanium oxide fiber, silicon carbide fiber, rock wool, potassium titanate whisker, barium titanate whisker, aluminum borate whisker, and silicon nitride whisker; and powdery, particulate and plate-like fillers of natural inorganic minerals, such as mica, talc, kaolin, silica and sand, calcium carbonate, glass beads, glass flake, glass micro-balloon, clay, molybdenum disulfide, wallastenite, montmorillonite, titanium oxide, zinc oxide, calcium polyphosphate and graphite. Any type of glass fiber can be used without particular restriction as far as it is generally usable for reinforcement of resins, and can be selected from chopped strands of long fiber type and short fiber type, and milled fiber. The above-mentioned fillers can be used in two or more species in combination. Incidentally, these fillers can be used after surface treatment thereof with known coupling agents, such as silane coupling agents and titanate coupling agents, and other surface treating agents. Further, the glass fiber can be coated or bundled with a thermoplastic resin, such as ethylene/vinyl acetate copolymer, or a thermosetting resin such as epoxy resin. The filler may be added in 0.1-100 wt. parts, preferably 1-50 wt. parts, per 100 wt. parts of the PGA resin.

EXAMPLES

Hereinbelow, the present invention will be described more specifically based on Examples of producing PGA as an aliphatic polyester. The physical properties (or values) described in the present specification including the following description are based on those measured according to the following methods.

(1) Conversion

A glycolide content in a reaction mixture was measured to calculate a conversion of the glycolide. For measurement of the glycolide content, ca. 100 mg of a sample was dissolved in 2 ml of dimethyl sulfoxide (special grade, made by Kanto Kagaku K.K.) to which 4-chlorobenzophenone (made by Kanto Kagaku K.K.) was added at a concentration of 0.2 g/l as an internal standard, by heating at 150° C. for ca. 5 min., followed by cooling to room temperature and filtration. The measurement was performed by injecting 1 μl of the filtrate to a gas chromatography (GC) apparatus.

<GC Conditions>
Apparatus: "GC-2010" (made by K.K. Shimadzu Seisakusho).
Column: "TC-17" (0.25 mm in diameter×30 m in length)
Column temperature: Held at 150° C. for 5 min., heated to 270° C. at a rate of 20° C./min. and held at 270° C. for 3 min.
Injection temperature: 180° C.
Detector: FID (hydrogen flame ionization detector) at 300° C.

(2) Molecular Weight

A PGA polymer was heated at 275° C. for 90 sec., pressed under 2 MPa for 60 sec. and then quenched into iced water to form an amorphous polymer sheet, from which 10 mg of a polymer sample was cut out and dissolved in a GPC elution liquid shown below to form 10 ml of a sample solution. The solution was filtrated through a 0.1 μm-membrane filter made of polytetra-fluoroethylene and then injected into a gel permeation chromatography (GPC) apparatus for measurement of molecular weight under the following conditions. Incidentally, the sample was injected into the GPC apparatus within 30 minute after the dissolution. Based on the measured molecular weight distribution were determined a weight-average molecular weight, a number-average molecular weight and further a polydispersity (=weight-average molecular weight/number-average molecular weight).

<GPC Conditions>
Apparatus: "Shodex-104" made by Showa Denko K.K.
Column: Two columns of "HFIP-606M" were connected in series with 1 column of "HFIP-G" as a pre-column.
Column temperature: 40° C.
Elution liquid: An HFIP (hexafluoroisopropanol) solution containing sodium trifluoroacetate dissolved at 5 mM.
Flow rate: 0.6 ml/min.
Detector: RI (differential refractive index) detector.
Molecular weight calibration: Effected by using standard polymethyl methacrylate having different molecular weights (of 1,950,000, 659,000, 218,000, 50,000, 21,000, 7,000 and 2,000, made by Showa Denko K.K.).

(3) Yellowness Index (YI)

Sample pellets were spread in layers so as to provide a closest packing state on an accessory Petri dish (diameter: 3 cm×height: 1.3 mm) and measured by a colorimeter ("Color Analyzer TC-1800", made by Tokyo Denshoku, Co., Ltd.) calibrated by using a standard white plate (No. 88417).

Measurement Conditions:
Measured with a reflected light from Standard light C at a view angle of 2 degrees. Determined as an average of 3 values measured for 3 different positions of the sample on a measurement stage.

(4) Dissolved Oxygen:

100 μl of glycolide monomer melted at 100° C. was injected into a GC apparatus to obtain an oxygen peak area, from which a dissolved oxygen content in glycolide (unit: vol % (a normal-state oxygen volume/monomer liquid volume×100)) was calculated. A calibration curve of oxygen was prepared beforehand from peak areas obtained by injecting atmospheric air (oxygen concentration: about 21 vol. %) in volumes of 1-50 μl into a gas chromatograph (GC):

[GC Measurement Conditions]
Apparatus: "GC-7A" made by Shimadzu Corporation
Carrier gas: helium, 50 ml/min.
Column: 3 mm-dia.×3 m, packed with molecular-sieves 5A.
Column temperature: 50° C.
Injection temperature: Room temperature
Detecting element: TCD (a thermal conductivity detector, 125 mA, 150° C.).

(5) Moisture Content:

Measured by using a Karl Fischer moisture meter (KF) with respect to about 2 g of accurately weighed glycolide monomer:

[KF Measurement Conditions]
Apparatus: "CA-100" made Mitsubishi Chemical Corporation (evaporator: "VA-100") Evaporation temperature: 140° C.
Carrier gas: nitrogen, 250 ml/min
End sense: Measurement was terminated when a measured value decreased down to the background +0.05 μg/s.

(6) Residual Carboxylic Acid Terminal (COOH) Concentration

Accurately weighed 200-300 mg of a polymer sample was dissolved in 10 ml of dimethyl sulfoxide (DMSO) added thereto at 150° C. Several drops of 1 wt. % Bromothymol Blue/alcohol solution were added and the titration was performed with about 0.02 N-sodium hydroxide/benzyl alcohol solution. From the dropped amount, a number of equivalent (unit: eq/t) of the carboxyl group contained per 1 ton of polymer was calculated.

(7) Melt Viscosity

Measured by using "Capirograph 1-C" (made by Toyo Seiki-Seisakusho, Ltd.) equipped with a capillary tube (1 mm-dia.×10 mmL). About 20 g of a sample was introduced into the apparatus heated at 270° C. and held therein for 5 minutes, to measure a melt viscosity (unit: Pa-s) at a shear rate of 121 sec$^{-1}$, (8) Moisture Resistance Amorphous sheets produced from a polymer sample were crystallized at 80° C. for 10 minutes, and the crystallized sheets were held under in an environment of 50° C./90% RH for various lengths of time. From measured molecular weights measure after the holding, a time in which a weight-average molecular weight decreased to 70,000 was calculated. A relative ratio of the times was expressed as a moisture resistance index.

Example 1

Polyglycolic acid (PGA) was produced by ring-opening polymerization of glycolide by means of an apparatus system of which the outline is shown in FIG. 1. More specifically, particulate glycolide with a particle size (based on longer-axis) of about 2 mm was accommodated in a monomer tank 1 held under an atmosphere of dry air (oxygen concentration: about 21 vol. %, dew point: about −40° C.) supplied at appropriate intervals through a pipe GL1. The particulate glycolide was supplied at appropriate intervals through a pipe L12 into a monomer melting vessel 2 of the internal volume 50 L held under an atmosphere of dry air which was supplied at appropriate intervals through a pipe GL2, and was heated and melted at 100° C. The dissolved oxygen content was 2.0 vol %, and the moisture content was less than 30 ppm in the melted glycolide.

The melted glycolide in the monomer melting vessel 2 was continuously supplied at a rate of 30 kg/h through a pipe L23 to the bottom of a first reactor 3 of fully filled-type vertical cylinder with an internal volume of 1.8 L set to an internal temperature of about 180° C. under stirring by biaxial multi-level paddle blades. Simultaneously therewith, in the middle of the pipe L23, 1-dodecanol (initiator) at a rate of 0.25-mol % of glycolide and tin dichloride (catalyst) at a rate of 30 ppm (by weight of glycolide, as tin dichloride) as a solution (concentration: 0.015 g/ml) in ethyl acetate were supplied, respectively, and were continuously supplied to the bottom of the apparatus 3. The content was discharged from the upper part of the first reactor 3 after an average residence time of about 5 minutes, and exhibited a glycolide conversion of about 30% and a weight-average molecular weight of the produced polymer of about 100,000, as a result of analysis of a portion thereof taken in a steady operation state.

The reaction product (molten liquid) at about 180° C. withdrawn from the first reactor 3 was continuously supplied through a pipe L34 to an apparatus connection part (hopper) 41 of an equi-directionally rotating biaxial-type horizontal second reactor 4 ("KRC kneader S5 type", made by Kurimoto, Ltd.) having a jacket longitudinally divided into four sections of which the temperatures were independently set to 200° C., 210° C., 210° C. and 210° C., respectively. The inside of the apparatus connection part 41 was held under an atmosphere of dry nitrogen supplied from a pipe GL3. The dry nitrogen (dew point: about −40° C.) supplied through the pipe GL3 was designed to hold also an upper space of the apparatus 4 in dry nitrogen atmosphere. The reaction product discharged after an average residence time of about 12 minutes under stirring showed a conversion of 75%, and a weight-average molecular weight of about 200,000 of the product polymer.

The reactant product discharged at a temperature of about 215° C. from the second reactor 4 was supplied through a connection part 51 to an equi-directionally rotating biaxial-type horizontal solidifying-and-crushing apparatus 5 ("KRC kneader S4 type", made by Kurimoto, Ltd.) equipped with a jacket set to a temperature of about 80° C. The connection part 51 was provided in an airtight structure covering a hopper of the apparatus 5, and the dry nitrogen introduced from a pipe GL4 was designed to hold also an interior space of the apparatus 5 in dry nitrogen atmosphere. The average residence time in the apparatus 5 was about 2 minutes, and the particulate reaction product having an average particle size (based on longer-axis) of about 5 mm was discharged at a rate of about 30 kg/hr from the discharge part. The increase in conversion within the apparatus 5 was about 2%, and the apparatus 5 did not substantially act as a polymerization apparatus.

After reaching a steady state, continuous operation of the apparatus 3-5 was continued for 60 hours.

The particulate reaction product discharged from the solidifying-and-crushing apparatus 5 was sent through a pipe L56 to a solid-phase polymerization apparatus 6 in an inverted cone-shape of mixing apparatus ("SV Mixer", made by KOBELCO Eco-Solutions, Co. Ltd.) having an inner volume of about 1 m$^3$ and equipped with a planetary screw agitator 61 (having a screw-like helical agitation blade moving around circulatively inside of the inverted cone container to agitate the content, as somewhat different from the one shown in FIG. 1) until about 480 kg of the particulate reaction product was accumulated therein, followed by 2 hours of solid-phase polymerization at an internal temperature of 170° C. As a result, the polymerization conversion reached above 99% (residual monomer content: 0.2 wt. %). The thus-obtained PGA exhibited a melting point (Tm) of 222° C., a weight-average molecular weight (Mw) of 220,000, a polydispersity (Mw/Mn) of 2.0 and a yellowness index (YI) of 16.

After a stable operation of the solid-phase polymerization as described above, about 720 kg of particulate PGA with somewhat reduced angles was obtained and then was pelletized by using a twin-screw kneading extruder ("TEM41SS" made by Toshiba Machine Co., Ltd.) with set cylinder temperatures of 200 to 265° C. in the following manner. More specifically, the PGA particles and 200 ppm (by weight based on PGA) of a thermal stabilizer composed of a substantially equi-molar mixture of mono- and di-stearyl acid phosphate (trade name: "ADEKASTAB AX-71", made by Asahi Denka Kogyo K.K.) were simultaneously fed at a total rate of 80 kg/h to an upper hopper of the above-mentioned extruder. Simultaneously therewith, N,N-2,6-diisopropylphenylcarbodiimide (as a carboxyl group-capping agent) (made by Kawaguchi Kagaku Kogyo K.K.) in a proportion of 0.3 wt. % (of PGA) was supplied by side feeding at an intermediate point of the extruder to form pellets of the PGA composition. The thus-obtained PGA pellets exhibited a longer axis-based average diameter of 3 mm, a residual glycolide content of 0.2%, a melting point of 222° C., a weight-average molecular weight of 220,000, a polydispersity of 2.0, a YI of 18, a melt viscosity of 600 Pa-s and a residual terminal carboxyl group concentration of 0.8 eq/t.

Further, press sheets produced from the above PGA pellets were exposed in an environment of 50° C./90% RH to examine molecular weight changes with time, thereby measuring a time of 152 hours until the weight-average molecular weight decreased to 70,000.

Table 1 appearing hereafter shows gaseous atmospheres of the monomer melting vessel and the inlet of the second reactor, the outline of properties of the product PGA pellets in the above-mentioned Example 1, and Table 2 appearing hereafter shows reaction conversions after respective polymerization steps and weight-average molecular weights of the produced polymers (and time for the solid-phase polymerization), respectively, of the above-described Example inclusively, together with the results of Comparative Examples and Example 2 described below.

Comparative Example 1

PGA was produced in the same manner as in the above-described Example except for changing the supply gas through the pipe GL3 from dry nitrogen to dry air (dew point: −40° C.), to hold the first reactor-second-reactor connection part in a dry air atmosphere.

Comparative Example 2

PGA was produced in the same manner as in the above-described Example except for changing the supply gas through the pipes GL1 and GL2 from dry air to dry nitrogen, to form dry air atmospheres inside the monomer tank 1 and the monomer melting vessel 2. However, the conversion at the end of 2 hour of the solid-phase polymerization at an internal temperature of 170° C. was about 85 to 90%, so that the heating was continued to require 6 hours of heating until a polymerization conversion of 99% or above was attained.

Comparative Example 3

The apparatus generally as shown in FIG. 1 was used to operate the apparatus 1-5 in the same manner as in Comparative Example 3 except for omitting the dry nitrogen atmosphere control of the Comparative Example 3 of the apparatus connection parts 41 and 51 (that is, exposing these parts to the air (relative humidity: about 60%)).

However, after roughly 1 hour passed after reaching a steady state, the viscosity of the polymer discharged from the KRC kneader S4 type gradually began to rise, thereby finally causing runway and failure in control of the reaction. This is considered because the reaction liquid at a low conversion from the first reactor rapidly reacted in the second reactor due to the polymerization promotion effect of oxygen and water in the atmosphere.

20 kg of crushed product of the PGA partial polymer obtained in the above-mentioned steady state was charged in a 30 L-autoclave capable of internal temperature control in a nitrogen atmosphere. When heating was continued at an internal temperature of 170° C. for 2 hours to perform solid-phase polymerization, the polymerization conversion amounted to 99% or more. The particulate polymer after the solid-phase polymerization was pelletized and the properties thereof were evaluated in the same manner as in Example.

Comparative Example 4

PGA was produced in the same manner as in the above-described Example by using the apparatus generally as shown in FIG. 1 except for omitting the atmosphere controls within the monomer tank 1, the monomer melting vessel 2 and the apparatus connection parts 41 and 51 (that is, exposing these parts to the air).

Example 2

Polyglycolic acid (PGA) was produced by ring-opening polymerization of glycolide with the unit system of which an outline is shown in FIG. 2. More specifically, glycolide melted at a temperature of 95-100° C. in a monomer melting vessel 2 was supplied to a heat exchanger HE at a rate of 30 kg/h via a pipe L23 to be heated to 130° C., and a portion of 1-dodecanol (initiator) at a rate of 0.25 mol of the glycolide and tin dichloride (catalyst) at a rate of 30 ppm of the glycolide as a solution (at a concentration of 1.5 wt. %) dissolved in the remaining portion of the 1-dodecanol were respectively injected into the glycolide at intermediate points in a pipe L34 to a reactor 4, substantially identical to the reactor 4 in Example 1, whereby partially polymerized glycolide was supplied to the reactor 4. The residence time in the whole piping from the monomer melting vessel 2 to the inlet of the reactor 4 was about 7 minute, including residence time of 2 to 3 minutes in the heat exchanger HE. The conversion of the glycolide up to the inlet of the reactor 4 was about 11% and the molecular weight of the produced polymer was about 60,000.

The reactor 4 was longitudinally divided into two parts including a former part with a residence time of about 5 minutes and a preset temperature of 190° C. and a latter part with a residence time about 7 minutes and a preset temperature of 190° C., to discharge a polymer at a conversion of about 77% and a weight-average molecular weight of about 200,000.

The product from the reactor 4 was processed through a horizontal solidifying-and-crushing apparatus 5 with a preset temperature of 40° C. and a solid-phase polymerization apparatus 6 for 2 hours of polymerization, followed further by pelletization, to provide PGA.

The outlines of the above-mentioned Examples and Comparative Examples, and the evaluation results of the products are inclusively shown in the following Tables 1 and 2.

TABLE 1

| | | Gaseous phase atmosphere | | Properties of Product PGA | | | | | | |
|---|---|---|---|---|---|---|---|---|---|---|
| | Apparatus | Melting vessel | Inlet of Reactor 4 | Melt viscosity (Pa-s) | COOH (eq/t) | Moisture resistance Index * | Residual monomer content (wt. %) | Tm (° C.) | Mw (×104) | YI |
| Example 1 | FIG. 1 | Dry air | Dry nitrogen | 600 | 0.8 | 1.0 | 0.2 | 222 | 22 | 18 |
| Comp. Example 1 | FIG. 1 | Dry air | Dry air | 150 | 3.5 | 0.5 | 0.2 | 222 | 15 | 28 |
| Comp. Example 2 | FIG. 1 | Dry nitrogen | Dry nitrogen | 650 | 0.8 | 1.0 | 0.2 | 222 | 23 | 22 |
| Comp. Example 3 | FIG. 1 | Dry nitrogen | Atomospheric air | 350 | 1.2 | 0.9 | 0.2 | 222 | 19 | 18 |
| Comp. Example 4 | FIG. 1 | Atomospheric air | Atomospheric air | 100 | 4.1 | 0.5 | 0.2 | 222 | 14 | 32 |
| Example 2 | FIG. 2 | Dry air | Dry nitrogen | 660 | 1.2 | (1.0) | 0.2 | 222 | 24 | 20 |

* A value realtive to the moisture resistance of Example as 1.0. Number in ( ) is an estimated value.

TABLE 2

| | Apparatus | Dissolved oxygen (vol. %) | Water (ppm) | Inlet of Reactor 4 | | Outlet of Reactor 4 | | Solid-phase polymerization | | |
|---|---|---|---|---|---|---|---|---|---|---|
| | | | | Conversion (%) | Mw (×10$^4$) | Conversion (%) | Mw (×10$^4$) | Hours (hrs) | Conversion (%) | Mw (×10$^4$) |
| Example 1 | FIG. 1 | 2.0 | <30 | 30 | 10 | 75 | 20 | 2 | >99 | 22 |
| Comp. Example 1 | FIG. 1 | 2.0 | <30 | 30 | 10 | 90 | 15 | 2 | >99 | 15 |

TABLE 2-continued

| | Apparatus | Dissolved oxygen (vol. %) | Water (ppm) | Inlet of Reactor 4 | | Outlet of Reactor 4 | | Solid-phase polymerization | | |
|---|---|---|---|---|---|---|---|---|---|---|
| | | | | Conversion (%) | Mw ($\times 10^4$) | Conversion (%) | Mw ($\times 10^4$) | Hours (hrs) | Conversion (%) | Mw ($\times 10^4$) |
| Comp. Example 2 | FIG. 1 | 0.5 | <30 | <10 | <5 | 15 | 5 | 6 | >99 | 23 |
| Comp Example 3 | FIG. 1 | 0.5 | <30 | <10 | <5 | 85 | 19 | 2 | >99 | 19 |
| Comp Example 4 | FIG. 1 | 2.0 | 200 | 40 | 8 | 95 | 14 | 2 | >99 | 14 |
| Example 2 | FIG. 1 | 2.0 | <30 | 11 | 6 | 77 | 22 | 2 | >99 | 24 |

INDUSTRIAL APPLICABILITY

As is understood from the results shown in Table 1 and 2, according to the present invention, there is provided a preferable combination of properties of product aliphatic polyester and production efficiency in a process for producing an aliphatic polyester, wherein a cyclic polyester is subjected to bulk-phase ring-opening polymerization and solid-phase polymerization, wherein a cyclic ester containing oxygen at an appropriate concentration is polymerized in a former period of the bulk-phase ring-opening polymerization and polymerized in a nitrogen atmosphere in the latter period.

The invention claimed is:

1. A process for producing an aliphatic polyester, comprising: subjecting a cyclic ester to a bulk-phase ring-opening polymerization step, and a solid-phase polymerization step, wherein a cyclic ester held in a dry air atmosphere is polymerized in a first stage of the bulk-phase ring-opening polymerization step, and a later stage of the bulk-phase ring-opening polymerization step is performed in a reactor held under a dry inert gas atmosphere.

2. The production process according to claim 1, wherein the dry inert gas is dry nitrogen.

3. The production process according to claim 1, wherein the cyclic ester is glycolide.

4. The production process according to claim 3, wherein the glycolide is a product obtained by depolymerization of glycolic acid oligomer according to a solution-phase depolymerization method.

5. The production process according to claim 1, wherein a catalyst dissolved in a low boiling solvent vaporizable at the bulk-phase ring-opening polymerization temperature is added to the cyclic ester prior to supply thereof to the reactor.

6. The production process according to claim 1, wherein a catalyst in solution with an initiator is added to the cyclic ester prior to supply thereof to the reactor.

7. The production process according to claim 1, wherein a partially polymerized molten product from the reactor is solidified, crushed and then subjected to the solid-phase polymerization step.

8. The production process according to claim 7, wherein the partially polymerized product after the solidification and crushing is pelletized together with a thermal stabilizer and then subjected to the solid-phase polymerization step.

* * * * *